J. Y. PAYTON.
FISH HOOK.
APPLICATION FILED JULY 2, 1915.
1,180,073.
Patented Apr. 18, 1916.
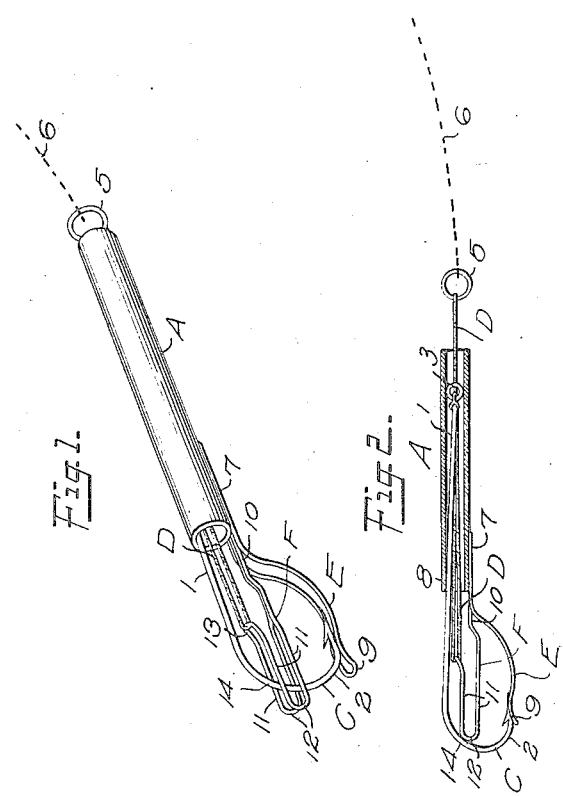
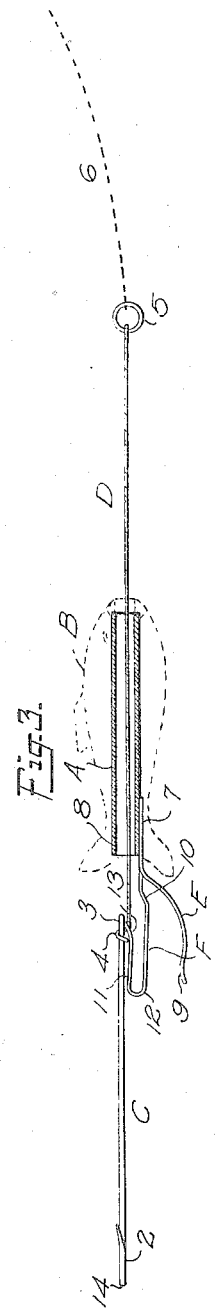
WITNESSES
George L. Blume.
C. Bradway.
INVENTOR
James Yelverton Payton
BY Munn & Co
ATTORNEYS

UNITED STATES PATENT OFFICE.

JAMES YELVERTON PAYTON, OF WALDRON, ARKANSAS, ASSIGNOR OF ONE-FOURTH TO JAMES L. CENTER AND ONE-FOURTH TO FRANK J. MAY, BOTH OF WALDRON, ARKANSAS.

FISH-HOOK.

1,180,073.     Specification of Letters Patent.     Patented Apr. 18, 1916.

Application filed July 2, 1915. Serial No. 37,671.

*To all whom it may concern:*

Be it known that I, JAMES YELVERTON PAYTON, a citizen of the United States, and a resident of Waldron, in the county of Scott and State of Arkansas, have invented a new and Improved Fish-Hook, of which the following is a full, clear, and exact description.

This invention relates to a fish hook of that type disclosed in United States Letters Patent 975,993, granted to me November 15, 1910, and the invention relates particularly to improvements in automatic fish hooks of this character.

The general objects of the present invention are to improve the construction and operation of fish hooks of the character referred to so as to be reliable and efficient in use, simple and inexpensive to manufacture, and so designed that the bait-carrying hook will act smoothly and effectively.

More specifically the invention has for its object to provide a fish catching device which has, associated with the bait-carrying hook, a guard of special form, which may be adjusted to press more or less lightly against the bill of the hook with just the force desired when the hook is set for fishing, so that a fish can readily suck or jerk the baited hook into its mouth, the hook being adapted to make suddenly a quarter turn as it reaches the forward limit of its movement, whereby the fish is more effectively impaled.

Another specific object of the invention is the employment of a doubled wire hook-shaped structure associated with the bait-carrying hook and guard in such a manner that the said structure enters the mouth and is clamped by the fish when the bait is seized, whereby the jaws of the fish are held apart two thicknesses of wire for the easy entrance of the baited hook into its mouth. This structure may have at its forward extremity straight lips or slightly open nipple lips, as may be found the more effective by actual test; it constitutes an auxiliary bait-holding means, a clamp for holding the hook in pocket-set position, whereby the device can be carried in the pocket, a guide for the short line to which the hook is connected, and a stop with which the bait-carrying hook is brought into engagement in order to bring the hook into proper relation with the guard in setting the hook in operative position.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a perspective view of the fish-catching device with the bait-carrying hook in pocket-set position; Fig. 2 is a view showing the tube or body in longitudinal section and the bait-carrying hook in operative position for fishing; and Fig. 3 is a view showing the bait-carrying hook projected to its extreme forward point.

Referring to the drawing, A designates a tubular body or casing which, if desired, may be surrounded by or attached to any suitable artificial bait B which is indicated by dotted lines in Fig. 3. The tubular body A is open at both ends and into it is inserted the shank or stem 1 of a bait-carrying hook C, the bill 2 of the hook being in the same plane with the eye 3 for purposes hereinafter to be explained. A short line D extends through the body A and has one end 4 connected with the hook, and attached to the other end may be a ring or equivalent device 5 for attachment in any suitable manner with a fish line 6. The tubular body A is of such length that when the hook C is set, as shown in Fig. 1, the eye of the hook will not project out of the body. A guard E is carried by and extends from that end of the body A from which the hook C projects, this guard being a doubled wire having its ends 7 soldered or otherwise rigidly secured to the body A, and from the end 8 of the body the guard curves laterally and forwardly and terminates in a bill-engaging extremity 9. This guard being made of resilient wire can be bent so as to throw the extremity 9 toward or from the axial line of the tubular body A, whereby the tension with which it engages the bill of the hook C, as shown in Fig. 2, can be varied. This guard not only protects the hook from catching in weeds, grass, rocks and other obstructions, but holds the hook in its operative or set position so that the baited hook can be sucked or jerked forward into a fish's mouth.

A hook-shaped structure F is carried by the hook end 8 of the body A and so positioned as to lie between the hook C and guard E when the hook is in set position. This structure F is preferably made of a doubled wire having its base-forming members 10 disposed between the base members 7 of the guard and also soldered or otherwise rigidly secured to the body A. The members 10 extend forwardly and are each doubled to form parallel U-shaped jaws 11 which terminate in lips 12 formed by the bending back or doubling of the wire. The two jaws are connected together by the doubled portion or loop 13 which completes the hook-shaped structure F. The end 13 of the bill of this hook-shaped structure lies approximately in the axial line of the body A and forms a guide for the short line D. The jaws 11 of the device F serve to grip or clamp the bait-carrying hook C when the fish-catching device is set for carrying in the pocket, as shown in Fig. 1, whereby the jaws prevent the hook from working out and rigidly hold its point from turning aside from under the protecting guard E. The lips 12 of the device F serve as a stop with which the curved part 14 of the hook C is adapted to engage when the stem of the hook is inserted into the body A for the purpose of setting the hook for fishing, and by a slight lateral turn and pressure the bill of the hook will snap into position under the guard, as shown in Fig. 2. Another important function of the device F is that it serves as an auxiliary bait holder.

When the hook is set, as shown in Fig. 2, the bill thereof lies in the same plane with the guard E and auxiliary bait-holding device F, but when the hook is fully projected the bill thereof lies in a plane at right-angles to the parts E and F, as shown in Fig. 3. This is due to the fact that the eye 3 is adapted to lie flat against the outside of the bill portion 13 of the device F when the line D is taut and the hook is fully pulled out. In other words, the hook suddenly makes a quarter turn at the extreme limit of its stroke in moving from its set position to its fully projected position. This turning of the hook occurs at its deepest reach into the fish's mouth, and consequently the fish is more effectively impaled.

According to the patented device hereinbefore referred to, the hook when set is gripped between the lips of the guard which overlie the hook and form three thicknesses of wire which renders it more difficult to enter the fish's mouth, and furthermore, the fish in seizing the bait closes the lips against the hook and prevents its forward movement. These difficulties are overcome in the present construction, as the jaws 11 are used only when the hook is placed in pocket-set position, and the lips 12 of the jaws lie behind the hook when the latter is set in operative position for fishing, as shown in Fig. 2, thereby presenting only two thicknesses of wire to be taken by the fish, which permits a smaller mouth opening; also the jaws, instead of clamping, actually protect the hook from being clamped between the jaws of the fish; and moreover, the hook is already slightly within the mouth of the fish when the bait is seized; also the jaws of the fish are held apart by two thicknesses of wire. This absolutely insures entrance into the fish's mouth when the hook is tripped.

Other advantages in the present construction over the previous one are that there is more room for holding bait and more ease in baiting; the flexible attachment or short line D is so attached to the hook as to cause the latter to make suddenly a quarter turn at the end of its stroke; the hook is held firmly between two clamping jaws of doubled wire, making four points of gripping engagement with the hook when the latter is in pocket-set position, and only the bill of the hook is engaged with the guard, which latter can be adjusted so as to obtain a delicate spring tension engagement with the bill when the hook is set in operative position. This gives facility and regularity in the setting of the hook and a smooth, quick action in the tripping.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A device of the class described comprising a body, a hook having its shank normally disposed in the body, means connected with the hook for throwing the same forwardly out of the body, and a guard carried by the body and having a free extremity under which the bill of the hook is adapted to yieldingly engage.

2. A device of the class described comprising a body, a hook having its shank normally disposed in the body, means connected with the hook for throwing the same forwardly out of the body, and a guard formed of a doubled resilient wire fastened to the body and extending from the end thereof, with the looped end of the guard forming a seat with which the bill of the hook is adapted to engage when the hook is set in operative position.

3. A device of the class described comprising a body, a hook having its shank normally disposed in the body, means connected with the hook for throwing the same forwardly out of the body, and a guard formed of a doubled resilient wire fastened to the body and extending from the end thereof, with the looped end of the guard forming a seat with which the bill of the hook is adapted to engage when the hook is set in operative position, the guard being bendable to throw the extremity thereof toward or from the axis of the body to vary the frictional engagement between the bill of the hook and the guard.

4. A device of the class described comprising a body, a bait-carrying hook having a shank normally disposed in the body and adapted to be thrown forwardly therefrom, and a guard carried by the body and disposed wholly to one side of the axis thereof and projecting forwardly from the body, with the end of the guard forming a seat with which the bill of the hook is adapted to engage.

5. A fish catching device comprising a body, a hook slidable longitudinally of the body, a guard on the body with which the bill of the hook is engaged when the hook is set in operative position, and an auxiliary bait holder carried by the body and lying within the bend of the hook when the latter is set in operative position.

6. A fish catching device comprising a body, a hook slidable longitudinally of the body, a guard on the body with which the bill of the hook is engaged when the hook is set in operative position, an auxiliary bait holder carried by the body and lying within the bend of the hook when the latter is set in operative position, and a line extending through the body and connected with the hook and guided by the auxiliary bait holder.

7. A device of the class described comprising a body, a hook slidable longitudinally thereof, a line extending through the body and connected with the hook, a guard on the body and with which the bill of the hook normally engages, a hook-shaped structure carried by the body and lying between the guard and hook, said structure forming a clamp for holding the hook when not in use, a bait holder, a stop for determining the position of the hook with respect to the guard when setting the hook, and a guide for the said line.

8. A device of the class described comprising a body, a hook slidable in the body, a guard attached to the body and with which the bill of the hook is adapted to engage, and an auxiliary bait holder lying between the guard and hook and provided with a pair of jaws between which the hook is adapted to be clamped when the device is not in use, and also formed with a loop, and a line connected with the hook and guided by the said loop.

9. A device of the class described comprising a body, a hook movably mounted therein and having an eye lying in the same plane with the bill of the hook, a line extending through the body and connected with the eye of the hook, and a guide arranged at one end of the body and on which the line is guided and coöperating with the eye of the hook for imparting a partial turn to the hook as it reaches the limit of its forward movement out of the body.

10. A device of the class described comprising a tubular body, a hook having its stem normally extending longitudinally in the body and slidable therein and having its bill disposed outside the body, a guard attached to and extending from one end of the body and provided with a free extremity forming a seat with which the bill of the hook is adapted normally to engage, and a hook-shaped structure formed of a doubled wire fastened to the body and lying between the guard and hook, a line extending longitudinally of the body and through the bill of the said structure and connected with the hook for throwing the same forwardly, said structure embodying a pair of clamping jaws for gripping the hook when not in use, the lips of the jaws forming a stop to determine the position of the hook in engaging the same with the guard, and the said structure forming an auxiliary bait holder.

In testimony whereof I have signed my name to this specification in the presence of two subscribing witnesses.

JAMES YELVERTON PAYTON.

Witnesses:
C. BRADWAY,
PHILLIP D. ROLLHAUS.